US010922788B1

(12) United States Patent
Yu et al.

(10) Patent No.: US 10,922,788 B1
(45) Date of Patent: Feb. 16, 2021

(54) METHOD FOR PERFORMING CONTINUAL LEARNING ON CLASSIFIER IN CLIENT CAPABLE OF CLASSIFYING IMAGES BY USING CONTINUAL LEARNING SERVER AND CONTINUAL LEARNING SERVER USING THE SAME

(71) Applicant: Stradvision, Inc., Pohang-si (KR)

(72) Inventors: Dongkyu Yu, Pohang-si (KR); Hongmo Je, Pohang-si (KR); Bongnam Kang, Pohang-si (KR); Wooju Ryu, Pohang-si (KR)

(73) Assignee: Stradvision, Inc., Gyeongsangbuk-do (KR)

( * ) Notice: Subject to any disclaimer, the term of this patent is extended or adjusted under 35 U.S.C. 154(b) by 0 days.

(21) Appl. No.: 17/088,045

(22) Filed: Nov. 3, 2020

Related U.S. Application Data

(60) Provisional application No. 63/017,758, filed on Apr. 30, 2020.

(51) Int. Cl.
  *G06T 3/40* (2006.01)
  *G06K 9/62* (2006.01)
  *G06N 3/08* (2006.01)
  *G06N 3/063* (2006.01)
  *G06N 3/04* (2006.01)

(52) U.S. Cl.
  CPC .......... *G06T 3/4046* (2013.01); *G06K 9/6256* (2013.01); *G06K 9/6281* (2013.01); *G06N 3/0454* (2013.01); *G06N 3/063* (2013.01); *G06N 3/084* (2013.01)

(58) Field of Classification Search
  CPC .. G06T 3/4046; G06K 9/6281; G06K 9/6256; G06N 3/063; G06N 3/0454; G06N 3/084
  See application file for complete search history.

(56) References Cited

U.S. PATENT DOCUMENTS

| | | | |
|---|---|---|---|
| 10,719,301 B1* | 7/2020 | Dasgupta | G06K 9/6267 |
| 2010/0158356 A1* | 6/2010 | Ranzato | G06K 9/6256 382/159 |
| 2015/0154441 A1* | 6/2015 | Zhang | G06K 9/6257 382/118 |
| 2017/0316284 A1* | 11/2017 | Chang | G06K 9/6256 |
| 2019/0005386 A1* | 1/2019 | Chen | G06K 9/6274 |
| 2020/0167608 A1* | 5/2020 | Madani | G16H 30/40 |
| 2020/0364478 A1* | 11/2020 | Zhang | G06N 3/0454 |

* cited by examiner

*Primary Examiner* — Aaron W Carter
(74) *Attorney, Agent, or Firm* — Taft Stettinius & Hollister LLP

(57) ABSTRACT

A method for performing continual learning on a classifier, in a client, capable of classifying images by using a continual learning server is provided. The method includes steps of: a continual learning server (a) inputting first hard images from a first classifier of a client into an Adversarial Autoencoder, to allow an encoder to output latent vectors from the first hard images, allow a decoder to output reconstructed images from the latent vectors, and allow a discriminator and a second classifier to output attribute and classification information to determine second hard images to be stored in a first training data set, and generating augmented images to be stored in a second training data set by adjusting the latent vectors of the reconstructed images determined not as the second hard images; (b) continual learning a third classifier corresponding to the first classifier; and (c) transmitting updated parameters to the client.

22 Claims, 5 Drawing Sheets

METHOD FOR PERFORMING CONTINUAL LEARNING ON CLASSIFIER IN CLIENT CAPABLE OF CLASSIFYING IMAGES BY USING CONTINUAL LEARNING SERVER AND CONTINUAL LEARNING SERVER USING THE SAME

CROSS REFERENCE OF RELATED APPLICATIONS

The present application claims the benefit of U.S. Provisional Patent Application No. 63/017,758, filed Apr. 30, 2020, the entire contents of which are incorporated herein by reference.

FIELD OF THE DISCLOSURE

The present disclosure relates to a method for performing continual learning on a classifier, in a client, capable of classifying images by using a continual learning server and the continual learning server using the same; and more particularly, to the method for updating the classifier in the client by generating and transmitting parameters for the continual learning from the continual learning server, wherein the parameters are generated by using a plurality of training data outputted as a result of applying reconstruction and augmentation processes to hard images determined as unclassifiable in the client, and the continual learning server using the same.

BACKGROUND OF THE DISCLOSURE

Image classification is used in various fields, such as security system, robotics, vehicles, medical treatment, and social media, etc., for humans or machines to identify and analyze objects.

In such image classification, a required performance and a learning method for an image classifier may vary depending on types of input images, purposes of using the image classification, and characteristics of the environment in which the image classification is used.

Therefore, at least one of learning methods, such as supervised learning, unsupervised learning, reinforcement learning, and continual learning, etc., to train algorithms of the image classifier is adopted and used according to the types of data available and the purposes of the image classification.

In particular, in a conventional image classification, a general continual learning is applied to a neural network (NN) of a server, whereby a new model is trained and either the new model or an existing model is selected by deciding which performs better.

However, in the conventional image classification, humans or machines may have difficulties in identifying at least some of the images when hard images are acquired as a result of variables like weather and noise affecting the process of the image classification. In order to accurately classify such hard images, an immense amount of training data may be required, and as network capacity increases due to accommodation of new training data, more computing power and higher training cost may be incurred.

Also, as the network capacity expands, a larger and heavier image classifier may be required for handling the increased computing power, but it is difficult to mount a large and heavy image classifier on a mobile device or a small terminal.

Furthermore, in the conventional image classification, a chronic problem such as Catastrophic Forgetting (CF) that loses information on previously learnt tasks in the process of learning a new task may occur.

Therefore, an enhanced method for solving the aforementioned problems is required.

SUMMARY OF THE DISCLOSURE

It is an object of the present disclosure to solve all the aforementioned problems.

It is another object of the present disclosure to update a classifier in a client by only using update information on parameters transmitted from its corresponding classifier in a continual learning server, wherein the classifier in the continual learning server has been trained with training data generated by using an Adversarial Autoencoder (AAE) in the continual learning server.

It is still another object of the present disclosure to use the update information on the parameters of the classifier in the continual learning server to update the classifier in the client by adopting a continual learning technique capable of updating one or more parameters of only selected layers or slightly expanding or adding the layers, to thereby effectively update the classifier in the client even with less amount of computing power compared to the amount required for a conventional method.

In accordance with one aspect of the present disclosure, there is provided a method for performing continual learning on a classifier, in a client, capable of classifying images by using a continual learning server, including steps of: (a) a continual learning server, if a first classifier in a client has outputted first classification information corresponding to each of acquired images, and first hard images determined as unclassifiable by the first classifier according to the first classification information corresponding to the acquired images have been transmitted from the client, performing or supporting another device to (i) perform a process of inputting each of the first hard images into an Adversarial Autoencoder (AAE), to thereby (i-1) allow an encoder in the Adversarial Autoencoder to encode each of the first hard images and thus to output each of latent vectors, (i-2) allow a decoder in the Adversarial Autoencoder to decode each of the latent vectors and thus to output each of reconstructed images corresponding to each of the first hard images, (i-3) allow a discriminator in the Adversarial Autoencoder to output attribute information on whether each of the reconstructed images is fake or real, and (i-4) allow a second classifier in the Adversarial Autoencoder to output second classification information on each of the latent vectors, and then (ii) perform a process of determining whether each of the reconstructed images is unclassifiable by the Adversarial Autoencoder based on the attribute information generated from the discriminator and on the second classification information generated from the classifier and thus selecting second hard images from the reconstructed images, to thereby (ii-1) store first reconstructed images which are determined as the second hard images as a first training data set, and (ii-2) generate each of augmented images through the decoder by adjusting each of the latent vectors corresponding to each of second reconstructed images which is determined as not the second hard images, and thus store the augmented images as a second training data set; (b) the continual learning server, performing or supporting another device to perform a process of continual learning on a third classifier in the continual learning server corresponding to the first classifier in the client by using the first training data set and the second training data set; and (c) the continual learning server, performing or supporting another device to perform a process of transmitting one or more updated parameters of the third classifier in the continual learning server to the client, to thereby allow the client to update the first classifier by using the updated parameters.

As one example, before the step of (c), the continual learning server performs or supports another device to perform a process of continual learning on the Adversarial Autoencoder by using (i) first existing labeled training data including first existing labeled images and (ii) first newly labeled training data generated by labeling each of the first reconstructed images included in the first training data set.

As another example, in the process of the continual learning of the Adversarial Autoencoder, the continual learning server performs or supports another device to perform a process of alternatively training an autoencoder and the discriminator wherein the autoencoder includes the encoder and the decoder, wherein the continual learning server performs or supports another device to perform processes of (i) acquiring a first base loss, which is an averaged loss corresponding to the first existing labeled training data, by using an existing autoencoder model previously trained with the first existing labeled training data or an existing discriminator model previously trained with the first existing labeled training data, (ii) sampling a first minibatch for all iterations of the process of the continual learning by selecting some part of data respectively from the first existing labeled training data and the first newly labeled training data at a certain ratio, (iii) inputting the first minibatch into the existing autoencoder model or the existing discriminator model, to thereby allow the existing autoencoder model or the existing discriminator model to output a first existing loss corresponding to the first existing labeled training data on the basis of its corresponding ground truth and a first new loss corresponding to the first newly labeled training data on the basis of its corresponding ground truth, and then (iv) (iv-1) back-propagating with the first new loss for all the iterations of the process of the continual learning and (iv-2) back-propagating with the first existing loss for some part of the iterations of the process of the continual learning when the first existing loss is larger than the first base loss, to thereby complete the process of training the autoencoder and the discriminator.

As another example, at the step of (a), the continual learning server performs or supports another device to perform (i) a process of storing the augmented images as the second training data set when the augmented images are determined as real by the discriminator and when (2_1)-st classification information on the augmented images is identical to (2_2)-nd classification information on the second reconstructed images corresponding to the augmented images, and (ii) a process of not storing the augmented images as the second training data set when the augmented images are determined as fake by the discriminator or when the (2_1)-st classification information on the augmented images is not identical to the (2_2)-nd classification information on the second reconstructed images corresponding to the augmented images.

As another example, at the step of (a), the continual learning server performs or supports another device to perform (i) a process of determining the reconstructed images as the second hard images if the reconstructed images are determined as fake by the discriminator or deviations of distributions of class-specific probabilities of the second classification information outputted from the second classifier are determined as lower than a first predetermined threshold by the second classifier, and (ii) a process of determining the reconstructed images as not the second hard images if the reconstructed images are determined as real by the discriminator and the deviations of the distributions of the class-specific probabilities of the second classification information outputted from the second classifier are determined as higher than a second predetermined threshold by the second classifier.

As another example, at the step of (a), the continual learning server performs or supports another device to perform (i) a process of determining the acquired images as the first hard images if deviations of distributions of class-specific probabilities of the first classification information outputted from the first classifier are determined as lower than a first predetermined threshold by the first classifier, and (ii) a process of determining the acquired images as not the first hard images if the deviations of the distributions of the class-specific probabilities of the first classification information outputted from the first classifier are determined as higher than a second predetermined threshold by the first classifier.

As another example, the continual learning server performs or supports another device to perform a process of allowing the encoder to perform down-sampling on each of the first hard images by applying at least one convolution operation and at least one pooling operation to each of the first hard images, to thereby generate each of the latent vectors representing feature values corresponding to each of the first hard images.

As another example, the continual learning server performs or supports another device to perform a process of allowing the decoder to perform up-sampling on each of the latent vectors by applying at least one deconvolution operation and at least one unpooling operation to each of the latent vectors, to thereby generate each of the reconstructed images corresponding to each of the first hard images.

As another example, the continual learning server performs or supports another device to perform processes of (i) acquiring a second base loss, which is an averaged loss corresponding to second existing labeled training data, by using an existing third classifier model previously trained with the second existing labeled training data, wherein the second existing labeled training data include second existing labeled images, (ii) sampling a second minibatch for all iterations of the process of the continual learning by selecting some part of data respectively from the second existing labeled training data and second newly labeled training data, wherein the second newly labeled training data are generated by labeling the first reconstructed images included in the first training data set and by labeling the augmented images included in the second training data set, at a certain ratio, (iii) inputting the second minibatch into the existing third classifier model, to thereby allow the existing third classifier model to output a second existing loss corresponding to the second existing labeled training data on the basis of its corresponding ground truth and a second new loss corresponding to the second newly labeled training data on the basis of its corresponding ground truth, and then (iv) (iv-1) back-propagating with the second new loss for all the iterations of the process of the continual learning and (iv-2) back-propagating with the second existing loss for some part of the iterations of the process of the continual learning when the second existing loss is larger than the second base loss, to thereby complete the process of the continual learning of the third classifier.

As another example, the continual learning server performs or supports another device to perform a process of transmitting update information on one or more updated parameters, updated neural network layers and updated classes to the first classifier on the client, to thereby allow the client to update the first classifier by using the update information on the updated parameters, the updated neural network layers, and the updated classes.

As another example, the continual learning server performs or supports another device to perform a process of allowing the client to perform at least one of processes of (i) selectively updating at least part of neural network layers included in the first classifier by referring to the update information on the updated parameters, (ii) adding at least one new neural network layers by referring to the update information on the updated neural network layers, and (iii) adding at least one classes by referring to the update information the updated classes, to thereby update the first classifier.

In accordance with another aspect of the present disclosure, there is provided a continual learning server for performing continual learning on a classifier, in a client, capable of classifying images, including: at least one memory that stores instructions; and at least one processor configured to execute the instructions to perform or support another device to perform: (I) if a first classifier in a client has outputted first classification information corresponding to each of acquired images, and first hard images determined as unclassifiable by the first classifier according to the first classification information corresponding to the acquired images have been transmitted from the client, (i) a process of inputting each of the first hard images into an Adversarial Autoencoder (AAE), to thereby (i-1) allow an encoder in the Adversarial Autoencoder to encode each of the first hard images and thus to output each of latent vectors, (i-2) allow a decoder in the Adversarial Autoencoder to decode each of the latent vectors and thus to output each of reconstructed images corresponding to each of the first hard images, (i-3) allow a discriminator in the Adversarial Autoencoder to output attribute information on whether each of the reconstructed images is fake or real, and (i-4) allow a second classifier in the Adversarial Autoencoder to output second classification information on each of the latent vectors, and then (ii) a process of determining whether each of the reconstructed images is unclassifiable by the Adversarial Autoencoder based on the attribute information generated from the discriminator and on the second classification information generated from the classifier and thus selecting second hard images from the reconstructed images, to thereby (ii-1) store first reconstructed images which are determined as the second hard images as a first training data set, and (ii-2) generate each of augmented images through the decoder by adjusting each of the latent vectors corresponding to each of second reconstructed images which is determined as not the second hard images, and thus store the augmented images as a second training data set; (II) a process of continual learning on a third classifier in the processor corresponding to the first classifier in the client by using the first training data set and the second training data set; and (III) a process of transmitting one or more updated parameters of the third classifier in the processor to the client, to thereby allow the client to update the first classifier by using the updated parameters.

As one example, before the process of (III), the processor performs or supports another device to perform a process of continual learning on the Adversarial Autoencoder by using (i) first existing labeled training data including first existing labeled images and (ii) first newly labeled training data generated by labeling each of the first reconstructed images included in the first training data set.

As another example, in the process of the continual learning of the Adversarial Autoencoder, the processor performs or supports another device to perform a process of alternatively training an autoencoder and the discriminator wherein the autoencoder includes the encoder and the decoder, wherein the processor performs or supports another device to perform processes of (i) acquiring a first base loss, which is an averaged loss corresponding to the first existing labeled training data, by using an existing autoencoder model previously trained with the first existing labeled training data or an existing discriminator model previously trained with the first existing labeled training data, (ii) sampling a first minibatch for all iterations of the process of the continual learning by selecting some part of data respectively from the first existing labeled training data and the first newly labeled training data at a certain ratio, (iii) inputting the first minibatch into the existing autoencoder model or the existing discriminator model, to thereby allow the existing autoencoder model or the existing discriminator model to output a first existing loss corresponding to the first existing labeled training data on the basis of its corresponding ground truth and a first new loss corresponding to the first newly labeled training data on the basis of its corresponding ground truth, and then (iv) (iv-1) back-propagating with the first new loss for all the iterations of the process of the continual learning and (iv-2) back-propagating with the first existing loss for some part of the iterations of the process of the continual learning when the first existing loss is larger than the first base loss, to thereby complete the process of training the autoencoder and the discriminator.

As another example, at the process of (I), the processor performs or supports another device to perform (i) a process of storing the augmented images as the second training data set when the augmented images are determined as real by the discriminator and when (2_1)-st classification information on the augmented images is identical to (2_2)-nd classification information on the second reconstructed images corresponding to the augmented images, and (ii) a process of not storing the augmented images as the second training data set when the augmented images are determined as fake by the discriminator or when the (2_1)-st classification information on the augmented images is not identical to the (2_2)-nd classification information on the second reconstructed images corresponding to the augmented images.

As another example, at the process of (I), the processor performs or supports another device to perform (i) a process of determining the reconstructed images as the second hard images if the reconstructed images are determined as fake by the discriminator or deviations of distributions of class-specific probabilities of the second classification information outputted from the second classifier are determined as lower than a first predetermined threshold by the second classifier, and (ii) a process of determining the reconstructed images as not the second hard images if the reconstructed images are determined as real by the discriminator and the deviations of the distributions of the class-specific probabilities of the second classification information outputted from the second classifier are determined as higher than a second predetermined threshold by the second classifier.

As another example, at the process of (I), the processor performs or supports another device to perform (i) a process of determining the acquired images as the first hard images if deviations of distributions of class-specific probabilities of the first classification information outputted from the first classifier are determined as lower than a first predetermined threshold by the first classifier, and (ii) a process of determining the acquired images as not the first hard images if the deviations of the distributions of the class-specific probabilities of the first classification information outputted from the first classifier are determined as higher than a second predetermined threshold by the first classifier.

As another example, the processor performs or supports another device to perform a process of allowing the encoder to perform down-sampling on each of the first hard images by applying at least one convolution operation and at least one pooling operation to each of the first hard images, to thereby generate each of the latent vectors representing feature values corresponding to each of the first hard images.

As another example, the processor performs or supports another device to perform a process of allowing the decoder to perform up-sampling on each of the latent vectors by applying at least one deconvolution operation and at least one unpooling operation to each of the latent vectors, to thereby generate each of the reconstructed images corresponding to each of the first hard images.

As another example, at the process of (II), the processor performs or supports another device to perform processes of (i) acquiring a second base loss, which is an averaged loss corresponding to second existing labeled training data, by using an existing third classifier model previously trained with the second existing labeled training data, wherein the second existing labeled training data include second existing labeled images, (ii) sampling a second minibatch for all iterations of the process of the continual learning by selecting some part of data respectively from the second existing labeled training data and second newly labeled training data, wherein the second newly labeled training data are generated by labeling the first reconstructed images included in the first training data set and by labeling the augmented images included in the second training data set, at a certain ratio, (iii) inputting the second minibatch into the existing third classifier model, to thereby allow the existing third classifier model to output a second existing loss corresponding to the second existing labeled training data on the basis of its corresponding ground truth and a second new loss corresponding to the second newly labeled training data on the basis of its corresponding ground truth, and then (iv) (iv-1) back-propagating with the second new loss for all the iterations of the process of the continual learning and (iv-2) back-propagating with the second existing loss for some part of the iterations of the process of the continual learning when the second existing loss is larger than the second base loss, to thereby complete the process of the continual learning of the third classifier.

As another example, the processor performs or supports another device to perform a process of transmitting update information on one or more updated parameters, updated neural network layers and updated classes to the first classifier on the client, to thereby allow the client to update the first classifier by using the update information on the updated parameters, the updated neural network layers, and the updated classes.

As another example, the processor performs or supports another device to perform a process of allowing the client to perform at least one of processes of (i) selectively updating at least part of neural network layers included in the first classifier by referring to the update information on the updated parameters, (ii) adding at least one new neural network layers by referring to the update information on the updated neural network layers, and (iii) adding at least one classes by referring to the update information the updated classes, to thereby update the first classifier.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION

Figure 1:
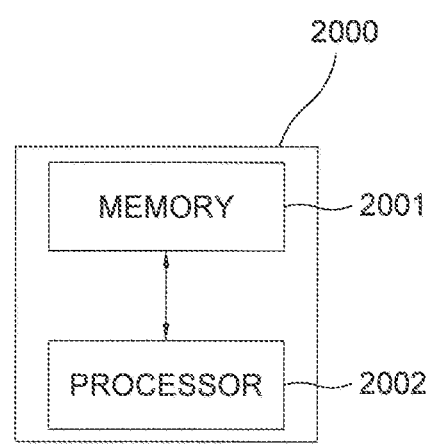
FIG. 1 is a drawing schematically illustrating a continual learning server for updating a classifier, in a client, capable of classifying images in accordance with one example embodiment of the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

To allow those skilled in the art to carry out the present disclosure easily, the example embodiments of the present disclosure will be explained by referring to attached diagrams in detail as shown below.

FIG. 1 is a drawing schematically illustrating a continual learning server 2000 for updating a classifier, in a client, capable of classifying acquired images in accordance with one example embodiment of the present disclosure.

By referring to FIG. 1, the continual learning server 2000 may include a memory 2001 for storing instructions to update the classifier, in the client, capable of classifying the acquired images, and a processor 2002 for performing processes to update the classifier in the client according to the instructions in the memory 2001.

Specifically, the continual learning server 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, as one example embodiment of the present disclosure, the continual learning server 2000 may update each of the classifiers in each of the clients by transmitting its corresponding update information to each of the clients, after performing a process of continual learning on each of matching classifiers in the continual learning server 2000 according to its corresponding hard images which are transmitted from each of the clients. Herein, each of the acquired images unclassifiable by each of the classifiers in each of the clients may be determined as each of the hard images.

On the other hand, as another example embodiment of the present disclosure, more than one of the classifiers in more than one of the clients may be matched to a single matching classifier in the continual learning server 2000. In such cases, the single matching classifier in the continual learning server 2000 may be trained by using training data generated from the hard images transmitted from more than one of the classifiers in more than one of the clients, and thus the single matching classifier may simultaneously transmit the update information to more than one of the classifiers in more than one of the clients, but the scope of the present disclosure is not limited thereto.

Henceforth, FIG. 2 to FIG. 5 may describe the present disclosure by using a single classifier in a single client and its corresponding single classifier in the continual learning server 2000 for the convenience of explanation, but the classifier in the client or the classifier in the continual learning server 2000 may be configured as multiple classifiers according to the different example embodiments of the present disclosure.

A method of using the continual learning server 2000 to update a first classifier 1100, in a client 1000, capable of classifying the acquired images in accordance with one example embodiment of the present disclosure by using the continual learning server 2000 configured as explained above is described by referring to FIG. 2 to FIG. 5.

Herein, the remaining description of the present disclosure may refer the 'acquired images' as 'the image' or 'the images' for the convenience of explanation.

Figure 2:
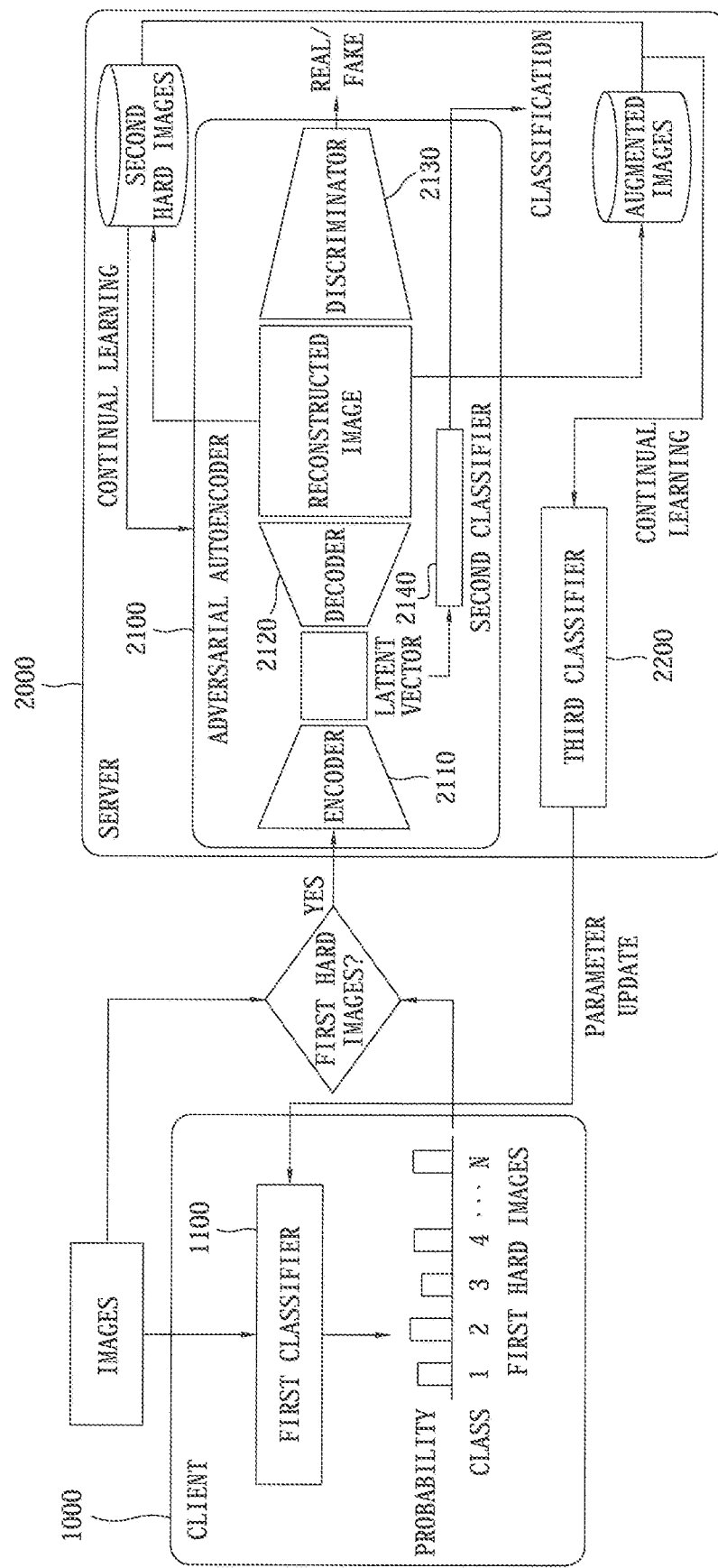
FIG. 2 is a drawing schematically illustrating a method of using the continual learning server to update the classifier in the client in accordance with one example embodiment of the present disclosure.

First, by referring to FIG. 2, the client 1000 may determine whether the images are first hard images by referring to first classification information, corresponding to the images, outputted from the first classifier 1100. Herein, video footages may also be inputted into the client 1000, and in such cases, the client 1000 may acquire the images corresponding to each of frames from the video footages.

Herein, the first classification information may be information on class-specific probabilities estimated by the first classifier 1100, and the client 1000 may determine whether the images are unclassifiable by the first classifier 1100, i.e., whether the images are the first hard images, by referring to the first classification information.

As one example, if deviations of the distributions of the class-specific probabilities in the first classification information are determined as lower than a (1_1)-st predetermined threshold, the client 1000 may determine that the first classifier 1100 has not been trained with the images or the first classifier 1100 is not able to classify the images even though the first classifier 1100 has been trained by using the images. In such cases, the client 1000 may classify the images as the first hard images.

On the other hand, if the deviations of the distributions of the class-specific probabilities in the first classification information are determined as higher than a (1_2)-nd predetermined threshold, the client 1000 may not determine the images as the first hard images. Herein, the (1_1)-st predetermined threshold and the (1_2)-nd predetermined threshold may represent the same value, but the scope of the present disclosure is not limited thereto.

Thereafter, the client 1000 may transmit the images determined as the first hard images to the continual learning server 2000. Herein, the client 1000 may transmit the first hard images to the continual learning server 2000 in real time, or store the first hard images in an internal storage device and transmit the stored first hard images to the continual learning server 2000 when at least one of certain conditions, such as a preset duration and a preset image volume, etc., are met.

Meanwhile, the client 1000 may include a memory for storing instructions to classify the images, transmit the first hard images to the continual learning server 2000 and update the first classifier 1100, and a processor for performing processes to classify the images, transmit the first hard images to the continual learning server 2000 and update the first classifier 1100, according to the instructions in the memory.

Specifically, the client 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

In addition, the client 1000 may be an autonomous vehicle, and may detect objects, lanes, and the like from driving images obtained from the first classifier 1100 while driving the vehicle. However, the client 1000 may not be limited to the autonomous vehicle, and may be applicable to computing devices, such as smartphones, manufacturing robots, etc., that recognize objects on the basis of classification on the images and perform an operation according to the recognized object information.

Next, when the first hard images are transmitted from the client 1000, the continual learning server 2000, may input the first hard images to an Adversarial Autoencoder (AAE) 2100, to thereby allow the Adversarial Autoencoder 2100 to classify the first hard images.

Herein, the Adversarial Autoencoder 2100 may allow an encoder 2110 in the Adversarial Autoencoder 2100 to encode each of the first hard images to output each of latent vectors, and allow a decoder 2120 in the Adversarial Autoencoder 2100 to decode each of the latent vectors to output each of reconstructed images corresponding to each of the first hard images.

As one example, the continual learning server 2000 may perform a process of allowing the encoder 2110 to perform down-sampling on each of the first hard images by applying at least one convolution operation and at least one pooling operation to each of the first hard images, to thereby generate each of the latent vectors representing feature values corresponding to each of the first hard images, but the scope of the present disclosure is not limited thereto.

Also, the continual learning server 2000 may perform a process of allowing the decoder 2120 to perform up-sampling on each of the latent vectors by applying at least one deconvolution operation and at least one unpooling operation to each of the latent vectors, to thereby generate each of the reconstructed images corresponding to each of the first hard images, but the scope of the present disclosure is not limited thereto.

After acquiring the latent vectors and the reconstructed images, the Adversarial Autoencoder 2100 may allow a discriminator 2130 in the Adversarial Autoencoder 2100 to output attribute information on whether each of the reconstructed images is fake or real, and allow a second classifier 2140 in the Adversarial Autoencoder 2100 to output second classification information on each of the latent vectors.

Thereafter, the continual learning server 2000 may determine whether the first hard images are also unclassifiable by the Adversarial Autoencoder 2100 by referring to the attribute information generated from the discriminator 2130 and the second classification information generated from the second classifier 2140.

As one example, first reconstructed images which are determined as fake by the discriminator 2130 or whose deviations of distributions of class-specific probabilities from the second classifier 2140 are determined as lower than a (2_1)-st predetermined threshold by the second classifier 2140 may be stored as second hard images in a first training data set. Herein, the reconstructed images that are unclassifiable by the Adversarial Autoencoder 2100 may be referred to as the first reconstructed images to be stored as the second hard images in the first training data set. Also, while the first hard images are selected among the images acquired by the client 1000 by referring to the first classification information, the second hard images are selected among the reconstructed images generated from the first hard images by referring to the attribute information and the second classification information.

On the other hand, second reconstructed images which are determined as real by the discriminator 2130 or whose deviations of the distributions of the class-specific probabilities of the second classification information outputted from the second classifier 2140 are determined as higher than a (2_2)-nd predetermined threshold by the second classifier 2140 may not be stored as the second hard images. Herein, the reconstructed images that are classifiable by the Adversarial Autoencoder 2100 may be referred to as the second reconstructed images.

Thus, in such cases, each of the latent vectors, which is an output from the encoder 2110 corresponding to each of the second reconstructed images, may be randomly adjusted or adjusted by using predetermined algorithm, to thereby allow the decoder 2120 to output each of augmented images. Herein, the (2_1)-st predetermined threshold and the (2_2)-nd predetermined threshold may represent the same value, but the scope of the present disclosure is not limited thereto.

In adjusting the latent vectors for data augmentation, a degree of adjustment of the latent vectors may be controlled such that adjusted latent vectors do not deviate from original latent vectors to the extent that the adjusted latent vectors generated based on the augmented images yield different second classification information from the original latent vectors generated based on the second reconstructed images corresponding to the augmented images. For example, the degree of the adjustment of the latent vectors may be controlled by adjusting each element of the latent vectors within a preset deviation limit from each original value of each element of the latent vectors, but the scope of the present disclosure is not limited thereto.

Accordingly, the continual learning server 2000 may store the augmented images as a second training data set when the augmented images are determined as real by the discriminator 2130 and when (2_1)-st classification information on the augmented images is identical to (2_2)-nd classification information on the second reconstructed images corresponding to the augmented images.

On the other hand, the continual learning server 2000 may not store the augmented images as the second training data set when the augmented images are determined as fake by the discriminator 2130 or when the (2_1)-st classification information on the augmented images is not identical to the (2_2)-nd classification information on the second reconstructed images corresponding to the augmented images.

Next, the continual learning server 2000 may generate first newly labeled training data by manually labeling each of the first reconstructed images, which are determined as the second hard images by the Adversarial Autoencoder 2100, included in the first training data set. Accordingly, the continual learning server 2000 may perform a process of continual learning of the Adversarial Autoencoder 2100 by using first existing labeled training data including first existing labeled images and the first newly labeled training data.

In detail, during the process of the continual learning of the Adversarial Autoencoder 2100, the continual learning server 2000 may perform a process of alternatively training an autoencoder and the discriminator 2130. Herein, the autoencoder includes the encoder 2110 and the decoder 2120, wherein the Adversarial Autoencoder 2100 includes the autoencoder and the discriminator 2130.

Figure 3:
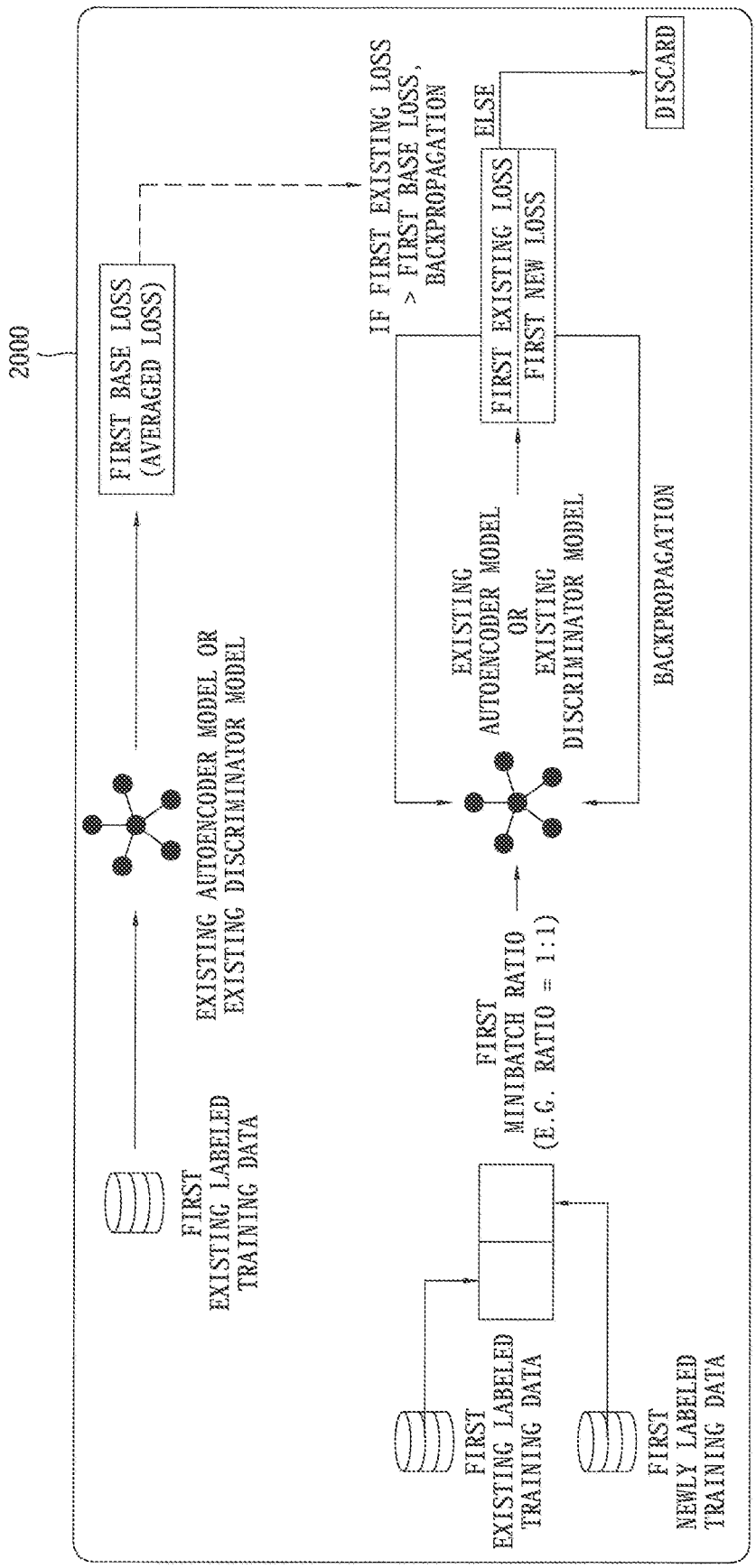
FIG. 3 is a drawing schematically illustrating a method of performing continual learning on the Adversarial Autoencoder in accordance with one example embodiment of the present disclosure.

FIG. 3 is a drawing schematically illustrating a method of performing continual learning on the Adversarial Autoencoder 2100 in accordance with one example embodiment of the present disclosure.

By referring to FIG. 3, the continual learning server 2000 may first acquire a first base loss, which is an averaged loss corresponding to the first existing labeled training data, by using an existing autoencoder model previously trained with the first existing labeled training data or an existing discriminator model previously trained with the first existing labeled training data, and then sample a first minibatch for all iterations of the process of the continual learning by selecting some part of data respectively from the first existing labeled training data and the first newly labeled training data at a certain ratio.

Following, the continual learning server 2000 may input the first minibatch into the existing autoencoder model or the existing discriminator model, to thereby allow the existing autoencoder model or the existing discriminator model to output a first existing loss corresponding to the first existing labeled training data on the basis of its corresponding ground truth and a first new loss corresponding to the first newly labeled training data on the basis of its corresponding ground truth.

Then, the continual learning server 2000 may (i) back-propagate with the first new loss for all the iterations of the process of the continual learning and (ii) back-propagate with the first existing loss for some part of the iterations of the process of the continual learning when the first existing loss is larger than the first base loss, to thereby complete the process of training the autoencoder and the discriminator 2130.

Therefore, after the second hard images classified by the Adversarial Autoencoder 2100 have been analyzed and classified by human labelers, the continual learning server 2000 may perform the process of the continual learning of the Adversarial Autoencoder 2100 as explained above, to thereby selectively update parameters of at least part of neural network layers, add at least one new neural network layers, or add at least one classes, and thus improve performance of the Adversarial Autoencoder 2100.

Next, by referring to FIG. 2 again, the continual learning server 2000 may perform a process of continual learning on a third classifier 2200 in the continual learning server 2000 corresponding to the first classifier 1100 in the client 1000 by using the first training data set and the second training data set identified by the Adversarial Autoencoder 2100.

Herein, the augmented images, stored as the second training data set, generated from the Adversarial Autoencoder 2100 may be results of augmentation on the images that are difficult to be identified by the first classifier 1100, while the second hard images, stored as the first training data set, may be results of further classification by the human labelers on the images that are difficult to be identified even by the Adversarial Autoencoder 2100. Therefore, the process of the continual learning of the third classifier 2200 may be performed using the augmented images and the second hard images, to thereby update the first classifier 1100 in the client 1000.

In the present disclosure, since the Adversarial Autoencoder 2100 in the continual learning server 2000 is not restricted in size, the Adversarial Autoencoder 2100 may be poised to have a higher performance than the first classifier 1100, to thereby enable the Adversarial Autoencoder 2100 to classify the first hard images determined as unclassifiable by the first classifier 1100. Likewise, the third classifier 2200 may also have performance equal to or higher than the first classifier 1100, and may only transmit part of update information related to parameters, neural network layers and classes, generated as a result of the process of the continual learning, to the first classifier 1100, to thereby account for physical constraints of the client 1000, such as the size and weight of the client 1000.

Figure 4:
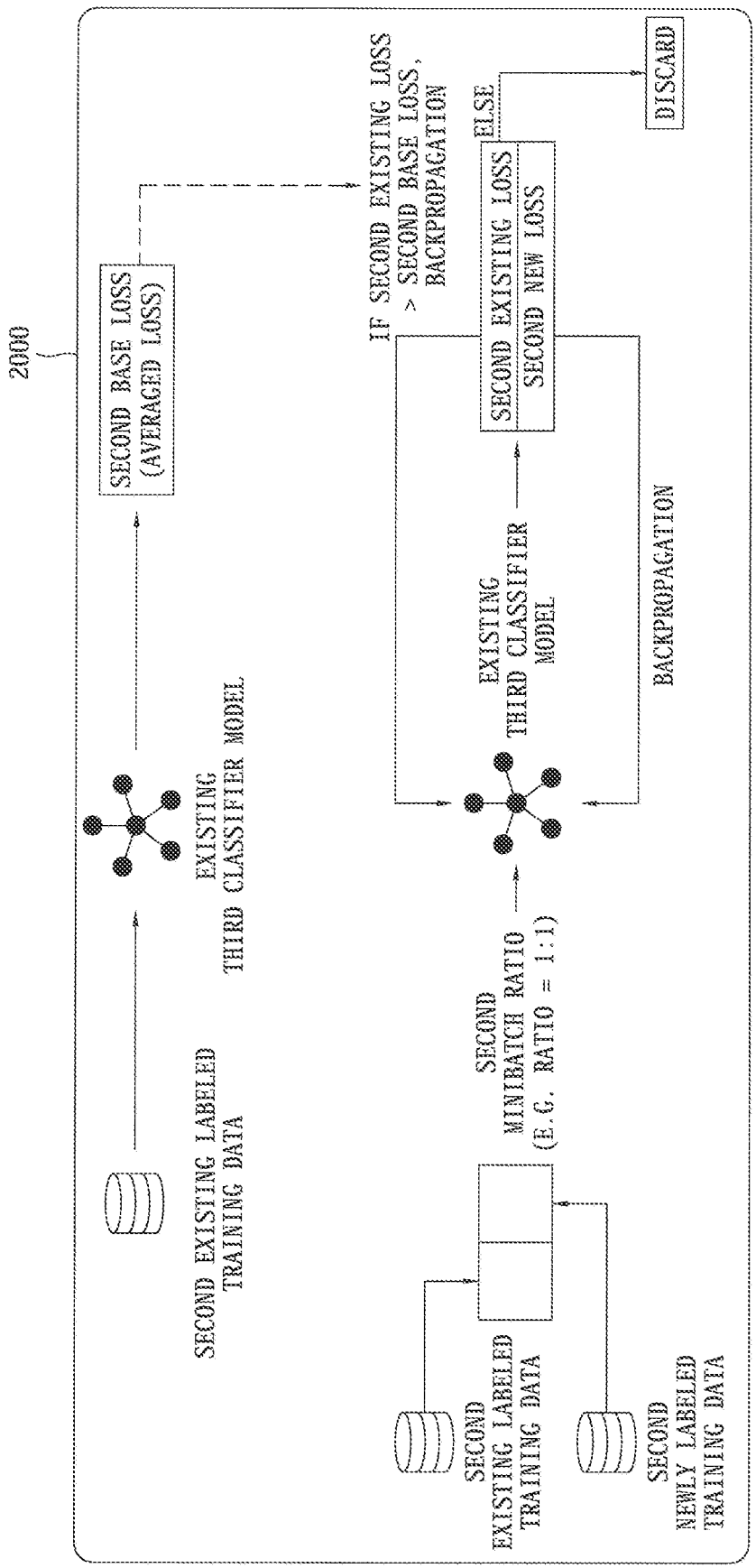
FIG. 4 is a drawing schematically illustrating a method of performing continual learning on a classifier in the continual learning server corresponding to the classifier in the client in accordance with one example embodiment of the present disclosure.

FIG. 4 is a drawing schematically illustrating a method of performing continual learning on the third classifier 2200 in the continual learning server 2000 in accordance with one example embodiment of the present disclosure.

By referring to FIG. 4, the continual learning server 2000 may first acquire a second base loss, which is an averaged loss corresponding to second existing labeled training data, by using an existing third classifier model previously trained with the second existing labeled training data, and then sample a second minibatch for all iterations of the process of the continual learning by selecting some part of data respectively from the second existing labeled training data and second newly labeled training data at a certain ratio. Herein, the second existing labeled training data may include second existing labeled images, while the second newly labeled training data may be generated by labeling the first reconstructed images included in the first training data set and by labeling the augmented images included in the second training data set.

Then, the continual learning server 2000 may input the second minibatch into the existing third classifier model, to thereby allow the existing third classifier model to output a second existing loss corresponding to the second existing labeled training data on the basis of its corresponding ground truth and a second new loss corresponding to the second newly labeled training data on the basis of its corresponding ground truth.

Next, the continual learning server 2000 may (i) back-propagate with the second new loss for all the iterations of the process of the continual learning and (ii) back-propagate with the second existing loss for some part of the iterations of the process of the continual learning when the second existing loss is larger than the second base loss, to thereby complete the process of the continual learning of the third classifier 2200.

In short, the third classifier 2000 may be trained such that a new third classifier model has almost the same performance as the existing third classifier model for the second existing labeled training data and has better performance than the existing third classifier model for the second newly labeled training data, by always reflecting the second newly labeled training data on the process of the continual learning of the third classifier 2200 and selectively reflecting some part of the second existing labeled training data thereon. Herein, said some part of the second existing labeled training data may be reflected on the process of the continual learning of the third classifier 2200 since said some part of the second existing labeled training data may contribute to enhance the performance of the new third classifier model.

Next, by referring to FIG. 2 again, the continual learning server 2000 may use transmission methods, such as OTA (over-the-air), to transmit one or more updated parameters of the third classifier 2200 in the continual learning server 2000 to the client 1000, to thereby allow the client 1000 to update the first classifier 1100 by using the updated parameters transmitted from the continual learning server 2000.

Figure 5:
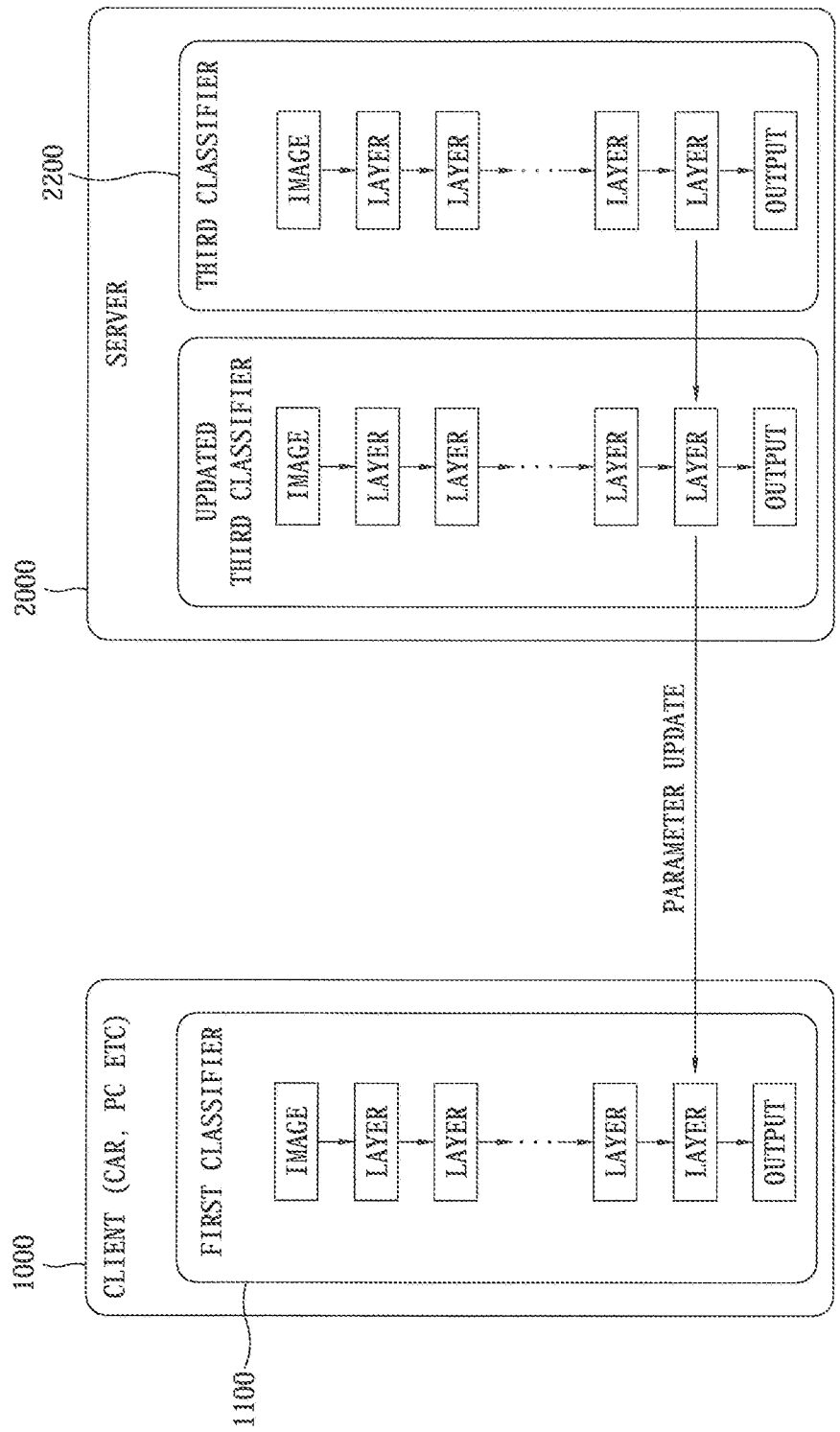
FIG. 5 is a drawing schematically illustrating a method of updating the classifier in the client by using the update information transmitted from the classifier in the continual learning server in accordance with one example embodiment of the present disclosure.

That is, by referring to FIG. 5, more efficient data transmission from the continual learning server 2000 to the client 1000 may be possible by only transmitting the update information on one or more updated parameters, updated neural network layers and updated classes, and thus the client 1000 may also increase its efficiency by updating the first classifier 1100 through only using the information on the updated parameters, the updated neural network layers, and the updated classes.

Herein, the continual learning server 2000 may allow the client 1000 to perform at least one of processes of selectively updating at least part of neural network layers included in the first classifier 1100 by referring to the update information on the updated parameters, adding at least one new neural network layers by referring to the update information on the updated neural network layers, and adding at least one classes by referring to the update information the updated classes, to thereby update the first classifier 1100.

As described above, the present disclosure proposes a configuration and a methodology of the Adversarial Autoencoder (AAE) that performs classification, reconstruction and augmentation processes on the first hard images, and through this, proposes an entire framework that trains the classifiers and efficiently transmits only the updated data.

The present disclosure has an effect of updating the classifier in the client by only using the update information on the parameters transmitted from its corresponding classifier in the continual learning server, wherein the classifier in the continual learning server has been trained with the training data generated by using the Adversarial Autoencoder (AAE) in the continual learning server.

The present disclosure has another effect of using the update information on the parameters of the classifier in the continual learning server to update the classifier in the client by adopting a continual learning technique capable of updating one or more parameters of only selected layers or slightly expanding or adding the layers, to thereby effectively update the classifier in the client even with less amount of computing power compared to the amount required for a conventional method.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as one or more software modules to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for performing continual learning on a classifier, in a client, capable of classifying images by using a continual learning server, comprising steps of:

(a) a continual learning server, if a first classifier in a client has outputted first classification information corresponding to each of acquired images, and first hard images determined as unclassifiable by the first classifier according to the first classification information corresponding to the acquired images have been transmitted from the client, performing or supporting another device to (i) perform a process of inputting each of the first hard images into an Adversarial Autoencoder (AAE), to thereby (i-1) allow an encoder in the Adversarial Autoencoder to encode each of the first hard images and thus to output each of latent vectors, (i-2) allow a decoder in the Adversarial Autoencoder to decode each of the latent vectors and thus to output each of reconstructed images corresponding to each of the first hard images, (i-3) allow a discriminator in the Adversarial Autoencoder to output attribute information on whether each of the reconstructed images is fake or real, and (i-4) allow a second classifier in the Adversarial Autoencoder to output second classification information on each of the latent vectors, and then (ii) perform a process of determining whether each of the reconstructed images is unclassifiable by the Adversarial Autoencoder based on the attribute information generated from the discriminator and on the second classification information generated from the classifier and thus selecting second hard images from the reconstructed images, to thereby (ii-1) store first reconstructed images which are determined as the second hard images as a first training data set, and (ii-2) generate each of augmented images through the decoder by adjusting each of the latent vectors corresponding to each of second reconstructed images which is determined as not the second hard images, and thus store the augmented images as a second training data set;

(b) the continual learning server, performing or supporting another device to perform a process of continual learning on a third classifier in the continual learning server corresponding to the first classifier in the client by using the first training data set and the second training data set; and (c) the continual learning server, performing or supporting another device to perform a process of transmitting one or more updated parameters of the third classifier in the continual learning server to the client, to thereby allow the client to update the first classifier by using the updated parameters.

2. The method of claim 1, wherein, before the step of (c), the continual learning server performs or supports another device to perform a process of continual learning on the Adversarial Autoencoder by using (i) first existing labeled training data including first existing labeled images and (ii) first newly labeled training data generated by labeling each of the first reconstructed images included in the first training data set.

3. The method of claim 2, wherein, in the process of the continual learning of the Adversarial Autoencoder, the continual learning server performs or supports another device to perform a process of alternatively training an autoencoder and the discriminator wherein the autoencoder includes the encoder and the decoder, wherein the continual learning server performs or supports another device to perform processes of (i) acquiring a first base loss, which is an averaged loss corresponding to the first existing labeled training data, by using an existing autoencoder model previously trained with the first existing labeled training data or an existing discriminator model previously trained with the first existing labeled training data, (ii) sampling a first minibatch for all iterations of the process of the continual learning by selecting some part of data respectively from the first existing labeled training data and the first newly labeled training data at a certain ratio, (iii) inputting the first minibatch into the existing autoencoder model or the existing discriminator model, to thereby allow the existing autoencoder model or the existing discriminator model to output a first existing loss corresponding to the first existing labeled training data on the basis of its corresponding ground truth and a first new loss corresponding to the first newly labeled training data on the basis of its corresponding ground truth, and then (iv) (iv-1) back-propagating with the first new loss for all the iterations of the process of the continual learning and (iv-2) back-propagating with the first existing loss for some part of the iterations of the process of the continual learning when the first existing loss is larger than the first base loss, to thereby complete the process of training the autoencoder and the discriminator.

4. The method of claim 1, wherein, at the step of (a), the continual learning server performs or supports another device to perform (i) a process of storing the augmented images as the second training data set when the augmented images are determined as real by the discriminator and when (2_1)-st classification information on the augmented images is identical to (2_2)-nd classification information on the second reconstructed images corresponding to the augmented images, and (ii) a process of not storing the augmented images as the second training data set when the augmented images are determined as fake by the discriminator or when the (2_1)-st classification information on the augmented images is not identical to the (2_2)-nd classification information on the second reconstructed images corresponding to the augmented images.

5. The method of claim 1, wherein, at the step of (a), the continual learning server performs or supports another device to perform (i) a process of determining the reconstructed images as the second hard images if the reconstructed images are determined as fake by the discriminator or deviations of distributions of class-specific probabilities of the second classification information outputted from the second classifier are determined as lower than a first predetermined threshold by the second classifier, and (ii) a process of determining the reconstructed images as not the second hard images if the reconstructed images are determined as real by the discriminator and the deviations of the distributions of the class-specific probabilities of the second classification information outputted from the second classifier are determined as higher than a second predetermined threshold by the second classifier.

6. The method of claim 1, wherein, at the step of (a), the continual learning server performs or supports another device to perform (i) a process of determining the acquired images as the first hard images if deviations of distributions of class-specific probabilities of the first classification information outputted from the first classifier are determined as lower than a first predetermined threshold by the first classifier, and (ii) a process of determining the acquired images as not the first hard images if the deviations of the distributions of the class-specific probabilities of the first classification information outputted from the first classifier are determined as higher than a second predetermined threshold by the first classifier.

7. The method of claim 1, wherein the continual learning server performs or supports another device to perform a process of allowing the encoder to perform down-sampling on each of the first hard images by applying at least one convolution operation and at least one pooling operation to each of the first hard images, to thereby generate each of the latent vectors representing feature values corresponding to each of the first hard images.

8. The method of claim 1, wherein the continual learning server performs or supports another device to perform a process of allowing the decoder to perform up-sampling on each of the latent vectors by applying at least one deconvolution operation and at least one unpooling operation to each of the latent vectors, to thereby generate each of the reconstructed images corresponding to each of the first hard images.

9. The method of claim 1, wherein, at the step of (b), the continual learning server performs or supports another device to perform processes of (i) acquiring a second base loss, which is an averaged loss corresponding to second existing labeled training data, by using an existing third classifier model previously trained with the second existing labeled training data, wherein the second existing labeled training data include second existing labeled images, (ii) sampling a second minibatch for all iterations of the process of the continual learning by selecting some part of data respectively from the second existing labeled training data and second newly labeled training data, wherein the second newly labeled training data are generated by labeling the first reconstructed images included in the first training data set and by labeling the augmented images included in the second training data set, at a certain ratio, (iii) inputting the second minibatch into the existing third classifier model, to thereby allow the existing third classifier model to output a second existing loss corresponding to the second existing labeled training data on the basis of its corresponding ground truth and a second new loss corresponding to the second newly labeled training data on the basis of its corresponding ground truth, and then (iv) (iv-1) back-propagating with the second new loss for all the iterations of the process of the continual learning and (iv-2) back-propagating with the second existing loss for some part of the iterations of the process of the continual learning when the second existing loss is larger than the second base loss, to thereby complete the process of the continual learning of the third classifier.

10. The method of claim 9, wherein the continual learning server performs or supports another device to perform a process of transmitting update information on one or more updated parameters, updated neural network layers and updated classes to the first classifier on the client, to thereby allow the client to update the first classifier by using the update information on the updated parameters, the updated neural network layers, and the updated classes.

11. The method of claim 10, wherein the continual learning server performs or supports another device to perform a process of allowing the client to perform at least one of processes of (i) selectively updating at least part of neural network layers included in the first classifier by referring to the update information on the updated parameters, (ii) adding at least one new neural network layers by referring to the update information on the updated neural network layers, and (iii) adding at least one classes by referring to the update information the updated classes, to thereby update the first classifier.

12. A continual learning server for performing continual learning on a classifier, in a client, capable of classifying images, comprising:
at least one memory that stores instructions; and
at least one processor configured to execute the instructions to perform or support another device to perform:
(I) if a first classifier in a client has outputted first classification information corresponding to each of acquired images, and first hard images determined as unclassifiable by the first classifier according to the first classification information corresponding to the acquired images have been transmitted from the client, (i) a process of inputting each of the first hard images into an Adversarial Autoencoder (AAE), to thereby (i-1) allow an encoder in the Adversarial Autoencoder to encode each of the first hard images and thus to output each of latent vectors, (i-2) allow a decoder in the Adversarial Autoencoder to decode each of the latent vectors and thus to output each of reconstructed images corresponding to each of the first hard images, (i-3) allow a discriminator in the Adversarial Autoencoder to output attribute information on whether each of the reconstructed images is fake or real, and (i-4) allow a second classifier in the Adversarial Autoencoder to output second classification information on each of the latent vectors, and then (ii) a process of determining whether each of the reconstructed images is unclassifiable by the Adversarial Autoencoder based on the attribute information generated from the discriminator and on the second classification information generated from the classifier and thus selecting second hard images from the reconstructed images, to thereby (ii-1) store first reconstructed images which are determined as the second hard images as a first training data set, and (ii-2) generate each of augmented images through the decoder by adjusting each of the latent vectors corresponding to each of second reconstructed images which is determined as not the second hard images, and thus store the augmented images as a second training data set; (II) a process of continual learning on a third classifier in the processor corresponding to the first classifier in the client by using the first training data set and the second training data set; and (III) a process of transmitting one or more updated parameters of the third classifier in the processor to the client, to thereby allow the client to update the first classifier by using the updated parameters.

13. The continual learning server of claim 12, wherein, before the process of (III), the processor performs or supports another device to perform a process of continual learning on the Adversarial Autoencoder by using (i) first existing labeled training data including first existing labeled images and (ii) first newly labeled training data generated by labeling each of the first reconstructed images included in the first training data set.

14. The continual learning server of claim 13, wherein, in the process of the continual learning of the Adversarial Autoencoder, the processor performs or supports another device to perform a process of alternatively training an autoencoder and the discriminator wherein the autoencoder includes the encoder and the decoder,
wherein the processor performs or supports another device to perform processes of (i) acquiring a first base loss, which is an averaged loss corresponding to the first existing labeled training data, by using an existing autoencoder model previously trained with the first existing labeled training data or an existing discriminator model previously trained with the first existing labeled training data, (ii) sampling a first minibatch for all iterations of the process of the continual learning by selecting some part of data respectively from the first existing labeled training data and the first newly labeled training data at a certain ratio, (iii) inputting the first minibatch into the existing autoencoder model or the existing discriminator model, to thereby allow the existing autoencoder model or the existing discriminator model to output a first existing loss corresponding to the first existing labeled training data on the basis of its corresponding ground truth and a first new loss corresponding to the first newly labeled training data on the basis of its corresponding ground truth, and then (iv) (iv-1) back-propagating with the first new loss for all the iterations of the process of the continual learning and (iv-2) back-propagating with the first existing loss for some part of the iterations of the process of the continual learning when the first existing loss is larger than the first base loss, to thereby complete the process of training the autoencoder and the discriminator.

15. The continual learning server of claim 12, wherein, at the process of (I), the processor performs or supports another device to perform (i) a process of storing the augmented images as the second training data set when the augmented images are determined as real by the discriminator and when (2_1)-st classification information on the augmented images is identical to (2_2)-nd classification information on the second reconstructed images corresponding to the augmented images, and (ii) a process of not storing the augmented images as the second training data set when the augmented images are determined as fake by the discriminator or when the (2_1)-st classification information on the augmented images is not identical to the (2_2)-nd classification information on the second reconstructed images corresponding to the augmented images.

16. The continual learning server of claim 12, wherein, at the process of (I), the processor performs or supports another device to perform (i) a process of determining the reconstructed images as the second hard images if the reconstructed images are determined as fake by the discriminator or deviations of distributions of class-specific probabilities of the second classification information outputted from the second classifier are determined as lower than a first predetermined threshold by the second classifier, and (ii) a process of determining the reconstructed images as not the second hard images if the reconstructed images are determined as real by the discriminator and the deviations of the distributions of the class-specific probabilities of the second classification information outputted from the second classifier are determined as higher than a second predetermined threshold by the second classifier.

17. The continual learning server of claim 12, wherein, at the process of (I), the processor performs or supports another device to perform (i) a process of determining the acquired images as the first hard images if deviations of distributions of class-specific probabilities of the first classification information outputted from the first classifier are determined as lower than a first predetermined threshold by the first classifier, and (ii) a process of determining the acquired images as not the first hard images if the deviations of the distributions of the class-specific probabilities of the first classification information outputted from the first classifier are determined as higher than a second predetermined threshold by the first classifier.

18. The continual learning server of claim 12, wherein the processor performs or supports another device to perform a process of allowing the encoder to perform down-sampling on each of the first hard images by applying at least one convolution operation and at least one pooling operation to each of the first hard images, to thereby generate each of the latent vectors representing feature values corresponding to each of the first hard images.

19. The continual learning server of claim 12, wherein the processor performs or supports another device to perform a process of allowing the decoder to perform up-sampling on each of the latent vectors by applying at least one deconvolution operation and at least one unpooling operation to each of the latent vectors, to thereby generate each of the reconstructed images corresponding to each of the first hard images.

20. The continual learning server of claim 12, wherein, at the process of (II), the processor performs or supports another device to perform processes of (i) acquiring a second base loss, which is an averaged loss corresponding to second existing labeled training data, by using an existing third classifier model previously trained with the second existing labeled training data, wherein the second existing labeled training data include second existing labeled images, (ii) sampling a second minibatch for all iterations of the process of the continual learning by selecting some part of data respectively from the second existing labeled training data and second newly labeled training data, wherein the second newly labeled training data are generated by labeling the first reconstructed images included in the first training data set and by labeling the augmented images included in the second training data set, at a certain ratio, (iii) inputting the second minibatch into the existing third classifier model, to thereby allow the existing third classifier model to output a second existing loss corresponding to the second existing labeled training data on the basis of its corresponding ground truth and a second new loss corresponding to the second newly labeled training data on the basis of its corresponding ground truth, and then (iv) (iv-1) back-propagating with the second new loss for all the iterations of the process of the continual learning and (iv-2) back-propagating with the second existing loss for some part of the iterations of the process of the continual learning when the second existing loss is larger than the second base loss, to thereby complete the process of the continual learning of the third classifier.

21. The continual learning server of claim 20, wherein the processor performs or supports another device to perform a process of transmitting update information on one or more updated parameters, updated neural network layers and updated classes to the first classifier on the client, to thereby allow the client to update the first classifier by using the update information on the updated parameters, the updated neural network layers, and the updated classes.

22. The continual learning server of claim 21, wherein the processor performs or supports another device to perform a process of allowing the client to perform at least one of processes of (i) selectively updating at least part of neural network layers included in the first classifier by referring to the update information on the updated parameters, (ii) adding at least one new neural network layers by referring to the update information on the updated neural network layers, and (iii) adding at least one classes by referring to the update information the updated classes, to thereby update the first classifier.

* * * * *